March 14, 1944. F. W. HACK 2,344,039
MULTIVERSAL MACHINE TOOL AND BORING HEAD THEREFOR
Filed Aug. 7, 1942 4 Sheets-Sheet 3
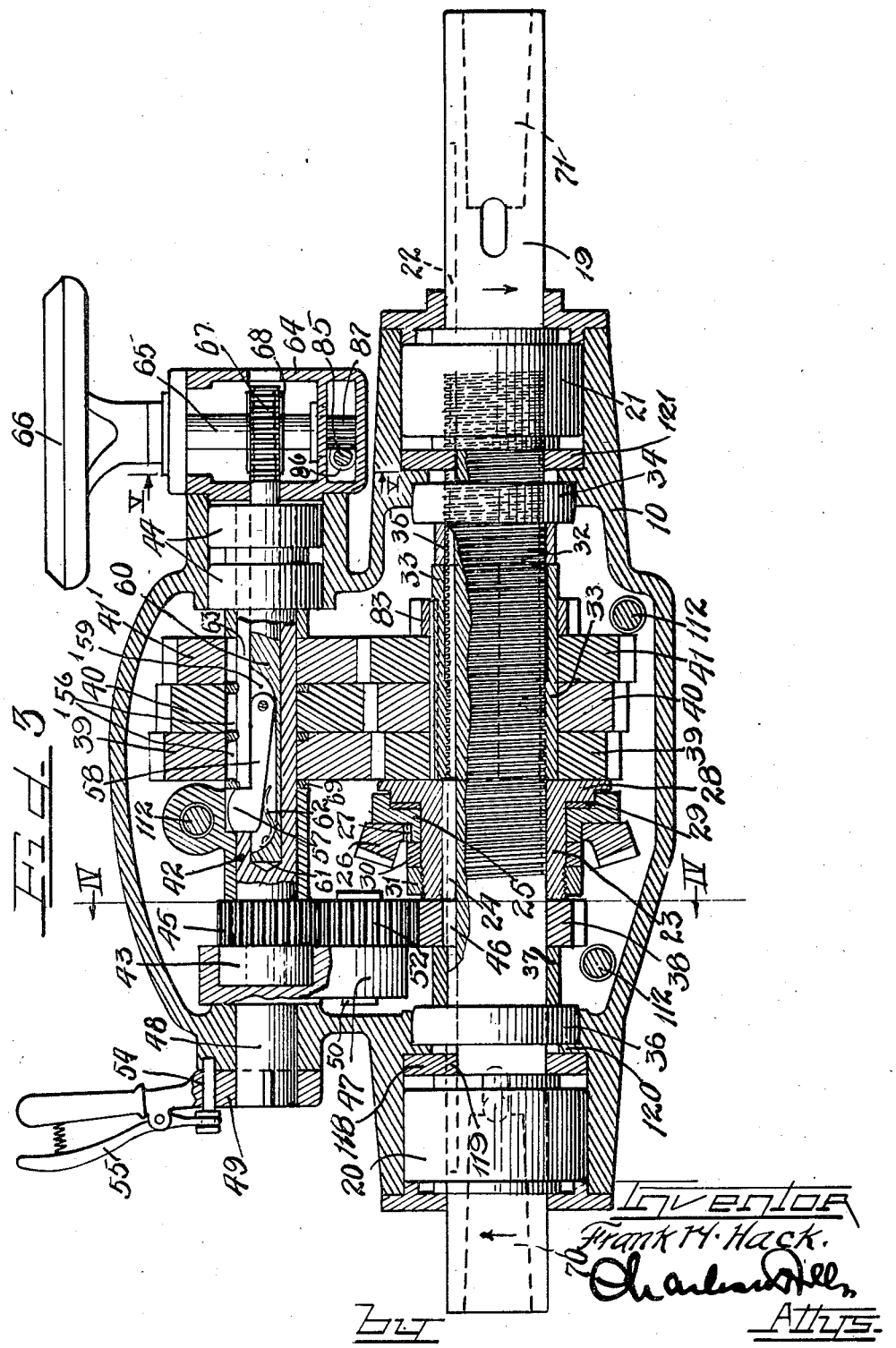

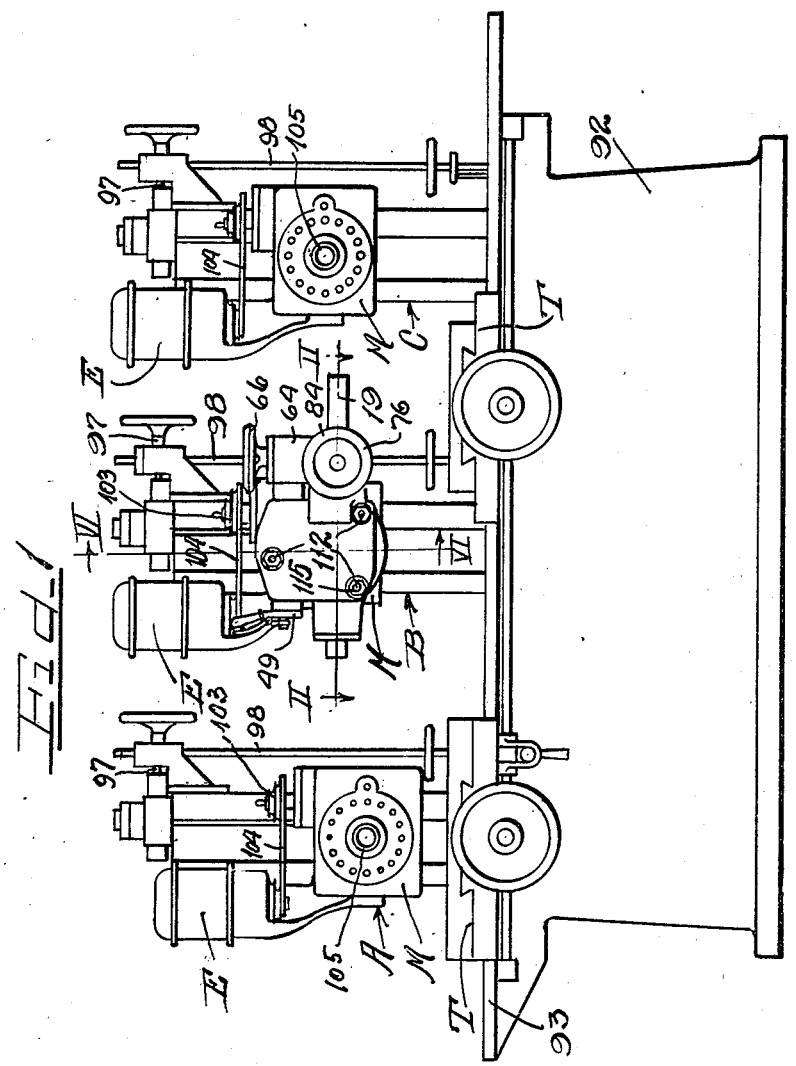

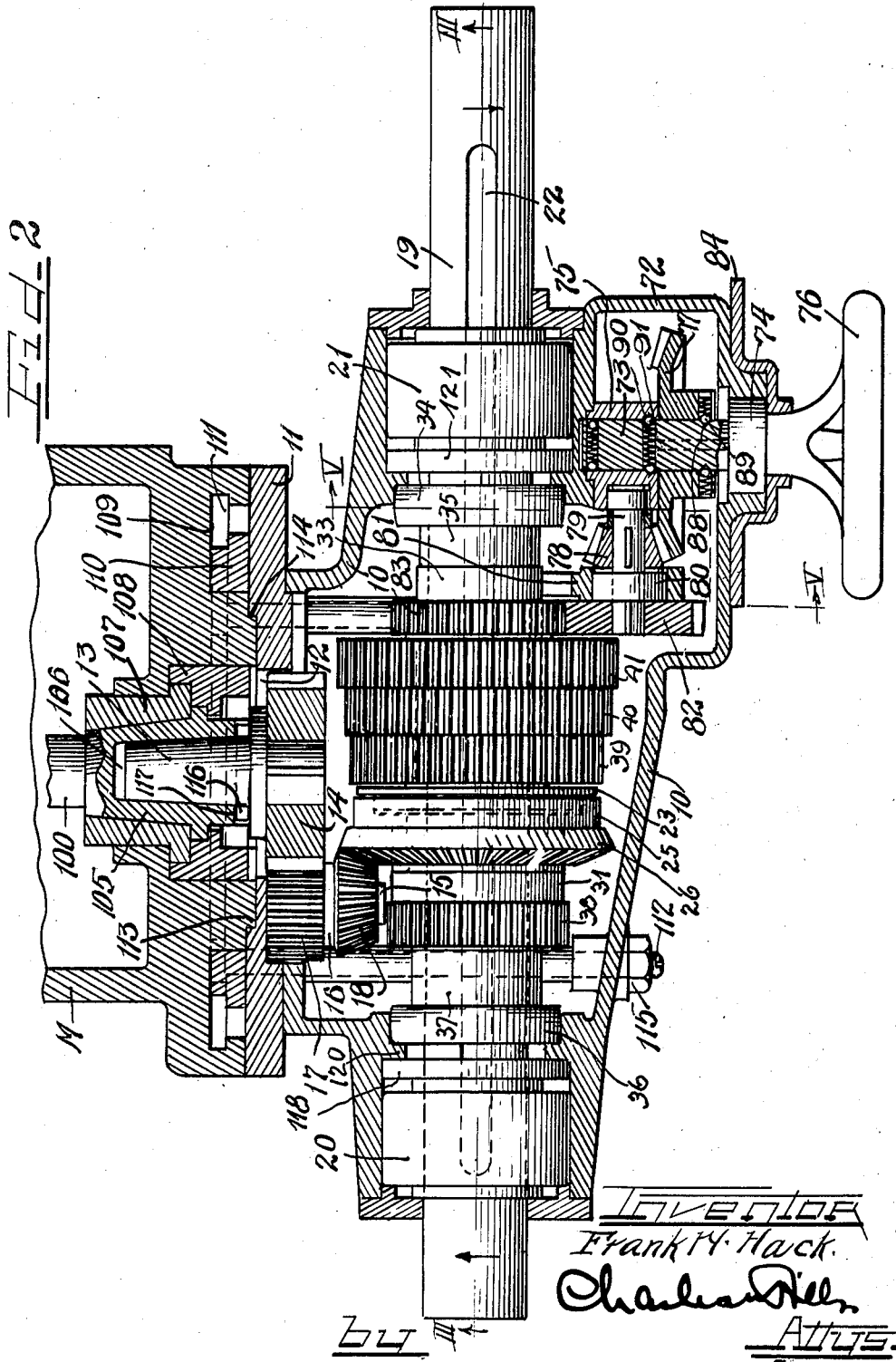

March 14, 1944. F. W. HACK 2,344,039
MULTIVERSAL MACHINE TOOL AND BORING HEAD THEREFOR
Filed Aug. 7, 1942 4 Sheets-Sheet 4
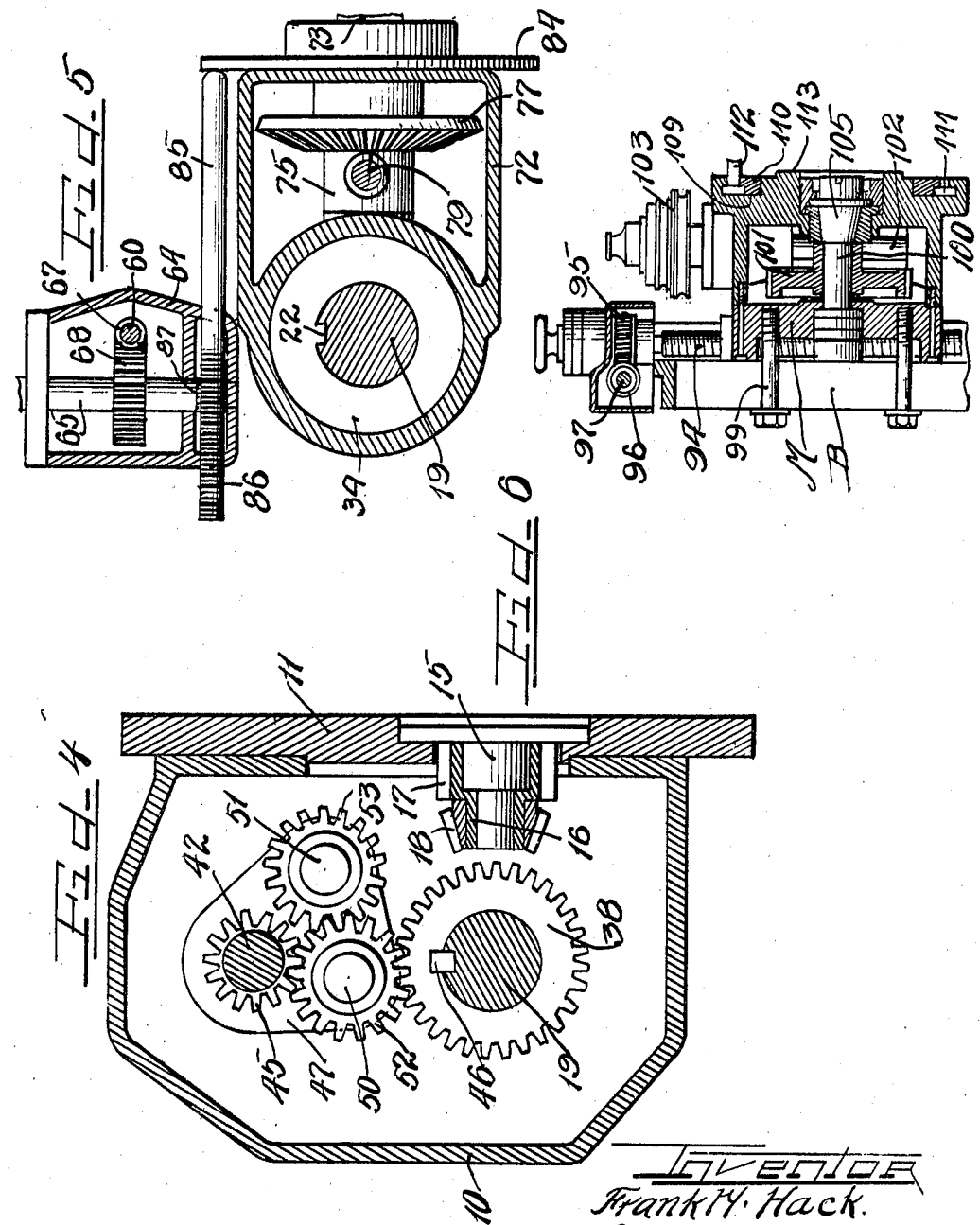
Inventor
Frank W. Hack.
by Charles Stiller
Attys.

Patented Mar. 14, 1944

2,344,039

UNITED STATES PATENT OFFICE 2,344,039

MULTIVERSAL MACHINE TOOL AND BORING HEAD THEREFOR

Frank W. Hack, Des Plaines, Ill.

Application August 7, 1942, Serial No. 453,946

2 Claims. (Cl. 29—26)

My invention relates to multiversal machine tools such as disclosed in my Patent No. 2,181,128 dated November 28, 1939, and in my Patent No. 2,318,938 dated May 11, 1943, the invention concerning particularly an improved boring head for use on machines of this type.

In machines of the type referred to, a master head is movable vertically on a ram or column extending upwardly from the machine bed on which one or more work supporting tables are adjustable, and the important object of my invention is to provide a boring head which may be readily adjustably mounted on the master head to be adjusted vertically therewith, and to be power operated, as from an electric motor mounted on the master head.

A further important object is to provide a boring head in which a tool supporting spindle is supported for rotary driving movement and axial feed movement, together with improved control means for accurately adjusting for and controlling the rotary and feed movement of the spindle.

A further object of the invention is to provide a boring head in which driving means for the spindle rotation is detachably coupled with driving means within the master head driven by the motor on the master head, together with feed controlling means adjustably driven by the spindle rotating means.

Still a further important object is to provide a boring head in which the spindle is double ended for receiving a tool in either end for cooperation with work on the supporting tables adjustable on the machine bed, together with control means for controlling the rate of feed of the spindle in either direction independently of the rotational speed of the spindle.

Another important object is to provide for hand feeding of the spindle together with means for automatically disconnecting the power feeding when the hand feeding is used and for automatically disconnecting the hand feeding means when the power feeding means is used.

Another feature of my invention is the mounting of the boring head on one of a number of columns extending upwardly from a common bed on which a number of tables are adjustable, in order that tools in the ends of the boring head spindle may be applied to work on said tables while said work is being engaged by other tools driven by supporting heads on other columns.

The above referred to and other features of my invention are embodied in the structure shown on the accompanying drawings, in which drawings:

Figure 1 is a front elevation of a multiversal machine to the middle column of which my improved boring head is applied;

Figure 2 is an enlarged section on plane II—II Figure 1;

Figure 3 is a section on plane III—III of Figure 2;

Figure 4 is a section on plane IV—IV Figure 3;

Figure 5 is a section on plane V—V Figures 2 and 3; and

Figure 6 is a section on plane VI—VI Figure 1.

Describing first the boring head, it comprises the housing 10 having the base wall 11. The base wall has the opening 12 therethrough for outward extension of a frusto-conical coupling plug 13 for connecting the structure within the head with a driving source, as will be explained more in detail later. At its inner end the plug carries a gear 14, and on a bearing stud 15 supported by and extending inwardly from the base wall 11 is journaled a hub 16 having the gear 17 at its outer end for meshing with the gear 14 and at its inner end having the bevel gear 18.

Forwardly of the bevel gear 18 the tool supporting spindle 19 extends through the housing and is journaled at its ends in anti-friction bearings 20 and 21. The spindle has the keyway 22 therein terminating a distance short of either end thereof. A collar 23 receives the spindle and a key 24 connects the collar with the spindle for rotation therewith but permitting axial movement of the spindle relative to the collar. Rotatably mounted on the collar is a friction ring 25 to which is secured a bevel gear 26, as by a key 27. The collar 23 has the flange 28 between which and the friction ring is interposed a friction washer 29. A washer 30 on the collar 23 engages the friction ring and a nut 31 threading on the end of the collar against the washer holds the friction ring against the friction washer 29 with predetermined pressure. The gear 26 is meshed by the bevel gear 18 so that when the coupling plug 13 is rotated, the gear 26 and the coupling ring 25 will be rotated, and by the frictional engagement of the friction ring with the collar 23 through the friction washer 29, the spindle 19 will be rotated.

The spindle is threaded as indicated at 32 and this threaded portion of the spindle receives the internally threaded bushing 33 which is preferably formed of cylindrical halves so that it can be readily applied to receive the spindle threads. At the right end of the housing 10 a thrust bearing 34 receives the spindle and between this thrust bearing and the adjacent end of the bushing 33 is the spacer sleeve 35. At the other end of the housing is the thrust bearing 36 and between this thrust bearing and the collar 23 is a spacer sleeve 37 and a gear 38, the collar 23 engaging the left end of the bushing 33. The bushing 33, the collar 23 and the gear 38 are thus held against axial movement on the spindle.

Receiving and keyed to the bushing 33 are a number of driving gears, three such gears 39, 40 and 41 being shown, and these gears mesh respectively with transmission gears 39', 40' and 41' on the countershaft 42. This countershaft is journaled at its ends in anti-friction bearings 43 and 44 respectively and carries a gear 45 which is in alignment with the gear 38 keyed to the spindle 19 by the key 46. The countershaft 42 is driven from the spindle 19 through the gear 38 and reversing mechanism between this gear and the gear 45 on the countershaft. Referring to Figures 3 and 4, the bearing 43 for the countershaft is supported in a plate 47 from which extends a stud 48 journaled in the adjacent sidewall of the housing 10 and having a lever 49 secured to its outer end whereby the plate 47 may be rotated. Studs 50 and 51 extend inwardly from the plate and journal respectively the gears 52 and 53, the gears being always in mesh with each other and the gear 52 being always in mesh with the countershaft gear 45. In the setting shown on Figure 4, the plate has been swung to bring the gear 52 into mesh with the driving gear 38 on the spindle so that the spindle and the countershaft will be rotated in the same direction. Upon swing of the plate by the lever 49 to unmesh the gear 52 from the gear 38 and to mesh the gear 53 with the gear 38, the drive from the gear 38 will be through the gears 53 and 52 to the countershaft gear and the countershaft will then rotate in a direction opposite to that of the spindle. A locking pin 54 controllable by a grip 55 on the lever will serve to lock the plate in either of its set positions.

Describing now the means for selectively connecting the transmission gears 39', 40' and 41' with the countershaft for the desired relative rotation of the bushing and spindle, each of the transmission gears has a keyway 56 for receiving a key 57. The key is at the inner end of lever 58 pivoted at its outer end within the recess 59 in the rod 60 which extends into the bore 61 in the countershaft, a spring 62 normally holding the lever swung with the key extending into the inner end of the keyway 63 in the countershaft, the outer end of the key being rounded as shown on Figure 3. When the rod 60 is pulled outwardly to bring the key 57 into alignment with the selected transmission gear, the key will find and enter the keyway in that gear for connecting the gear to the countershaft. Adjacent to the right end of the countershaft is the housing part 64 through which extends a shaft 65 having a hand wheel 66 on its outer end. The rod 60 extends into the housing 64 and has teeth 67 thereon meshed by the teeth of a wheel 68 on the shaft 65, so that when the hand wheel is turned the rod 60 will be shifted longitudinally in the countershaft for the desired setting of the key 57. Mounted on the countershaft between the gears are guard rings or washers 69 which, upon longitudinal movement of the rod 60, shift and hold the key 57 radially inwardly until it comes into accurate alignment with the keyway in the transmission gear to be connected before the key can enter such keyway, and simultaneous coupling of two of the gears to the countershaft is thus prevented.

The spindle 19 has at its ends the sockets 70 and 71 respectively in which boring or other tools may be secured. When the spindle is being rotated, the speed of rotation of the bushing 33 relative to the speed of rotation of the spindle will determine the axial movement of the spindle for feeding the corresponding tool to the work to be operated on. Referring to Figure 3, suppose that the left end of the spindle is supporting a tool which is to be applied to work to be operated on. The spindle will then be rotated in the direction of the arrow shown on the left end thereof. The gear 52 of the reversing mechanism will now be in mesh with the gear 38 on the spindle and the countershaft 42 will be rotated in the same direction as the spindle. By keying the desired transmission gear to the countershaft, the corresponding driving gear on the bushing 33 will be rotated for rotation of the bushing in direction opposite to the direction of rotation of the spindle, the differential rotation speed being controlled by the selected transmission gear. With the threading 32 on the spindle as shown, the rotation of the bushing will then cause comparatively rapid axial or feed shift of the spindle toward the left to feed the tool to the work.

If a tool is mounted in the right end of the spindle for application to work at the right thereof, the rotation of the spindle must be reversed and be in the direction of the arrow shown on the right end of the spindle. With the gear 52 in mesh with the gear 38, reversal of the spindle rotation will cause reversal in the direction of rotation of the countershaft. The desired rate of rotation of the bushing is then obtained by setting of the key 57, and as the bushing will rotate in the opposite direction to that of the spindle, the spindle will be axially fed comparatively rapidly toward the right for feeding of the tool to the work.

Upon variation in the speed of rotation of the spindle, the speed of rotation of the countershaft will be correspondingly varied and the rate of feeding of the spindle will be in accord with the rate of rotation of the shaft, the faster the rotation of the spindle, the faster the feed.

If lower speed of the spindle is desired, the lever 49 is operated to mesh the reversing gear 53 with the gear 38 on the spindle. Now, with the spindle rotating in the direction of the arrow on the left end thereof, the countershaft is rotated in the opposite direction but the bushing will be rotated in the same direction as, but at a slower rate than, the spindle. By selection of the gears on the countershaft, the rate of rotation of the bushing relative to that of the spindle will determine the rate of axial speed of the spindle toward the left. In the same manner, when the rotation of the spindle is reversed (arrow at right end) the bushing will be rotated in the same direction as the spindle but at a slower rate determined by the selected gear on the countershaft, and the spindle will be axially fed toward the right. The slower the speed of the bushing relative to the speed of rotation of the spindle, the faster will be the axial feed of the spindle.

Provision is also made for hand control of the spindle feed. Referring to Figure 2, the housing part 72 has a shaft 73 extending therethrough at right angles with the spindle, the shaft being journaled at its outer end by a bearing 74 in the front wall of the housing part 72 and at its inner end being journaled in a bearing structure 75 secured to the housing. At its front end the shaft mounts a hand wheel 76. In front of the bearing structure 75 the shaft has a bevel gear 77 keyed thereto but slidable forwardly a distance thereon and this gear is adapted to mesh a bevel pinion 78 on the shaft 79 paralleling the spindle 19 and journaled at its inner end in the bearing structure 75, the shaft adjacent to its outer end being journaled in an anti-friction bearing 80 mounted in the bracket 81 extending from the housing 10. At its inner end the shaft 79 carries a gear 82 which meshes with gear 83 keyed to the bushing 33 alongside of the driving gear 41 on the bushing.

When it is desired to hand feed the spindle, the hand wheel 66 is first set to disconnect the key 57 from the transmission gears on the countershaft 42. With the gear 77 in mesh with the pinion 78, the feed hand wheel 76 is turned for rotation of the sleeve 33 by the gear 83, the gears 39, 40 and 41, keyed to the bushing, then rotating with the bushing, but the transmission gears 39', 40' and 41' rotating idly on the countershaft 42. As the spindle is now being rotated, the bushing 33 can be rotated by the hand wheel 76 for the desired axial or feed movement of the spindle.

When the feed of the spindle is automatic through the transmission gears on the countershaft, the hand feed should be disconnected. This can be accomplished by manually pulling the feed hand wheel 76 outwardly for outward shift of the shaft 73 and unmeshing of the gear 77 from the pinion 78 (Figure 2). However, I have provided means for automatically disconnecting the hand feed when the automatic feed is put into operation, and for automatically disconnecting the automatic feed when the hand feed is set for operation. Referring to Figures 2 and 5, a disk 84 is mounted on the hand wheel hub outside of the housing part 72 for cooperating with a rod 85 which extends through the housing part 64 and has teeth 86 thereon for engaging the teeth 87 on the shaft 65 which supports the hand wheel 66 which controls the setting of the key 57 for the automatic feed. Referring to Figure 3, when the hand wheel 66 is turned for engagement of the key 57 with one of the transmission gears, the teeth 87 on the shaft 65 will engage the rack teeth 86 on the bar 85 for forward shift of this bar against the disk 84 and forward shift of the disk and the hand wheel for forward shift of the shaft 73 and the gear 77 therewith, for unmeshing of the gear from the pinion 78, thus effecting disconnection of the hand feed. If now it is desired to use the hand feed, the hand wheel 76 is shifted rearwardly with the disk 84 for remeshing the gear 77 with the pinion 78, but at the same time the disk 84 shifts the bar 85 for rotation of the shaft 65 and inward shift of the rod 60 for disconnection of the key 57 from the transmission gears on the countershaft.

Referring to Figure 2, the gear 77, although keyed to the shaft 73 to rotate therewith, will permit axial forward shifting of the shaft relative to the gear. The shaft 73 has V notches 88 engaged by spring pressed balls 89 in the hub of the gear 77 and these balls tend to hold the gear in meshing engagement with the pinion 78 when the hand wheel and the shaft have been moved rearwardly for hand feed. The bearing structure 75 has V notches 90 engageable by balls 91 which tend to hold the shaft in its inner position. Now, when the hand wheel 66 is turned for automatic feed from the position shown in Figure 3, before the key 57 will come into key engagement with the first transmission gear 39', the teeth 87 on the shaft 65 will have shifted the bar 85 a sufficient distance for forward movement of the disk 84 and outward movement of the hand wheel and shaft 73 to carry the gear 77 away from the pinion 78. Then as the key 57 is shifted outwardly for engagement with the transmission gears, the plate 84 and the feed hand wheel and shaft will be shifted further forwardly away from the gear 77 after the gear is stopped by the bearing 74. However, when the hand wheel 76 is shifted rearwardly for hand feed operation, the rod 85 will be shifted with the plate 84 for turning of the shaft 65 and shift of the rod 60 for disconnection of the key 57 from the transmission gears, and then, as the V slots in the shaft receive the balls 89, the gear 77 will be returned into meshing engagement with the pinion 78 ready for hand feed operation. The V slots 90 will also receive the balls 91 and the shaft 73 will be held thereby in its inner position during operation of the hand feed wheel.

Figure 1 shows a multiversal machine to which my improved boring head may be applied. In my said Patent No. 2,318,938, dated May 11, 1943, I disclose a universal machine tool in which one column extends upwardly from the back of the machine bed. In the instant application, the machine shown on Figure 1 has three columns A, B and C rising up from a base 92. On each of these columns a master head M is vertically adjustable on the column, to which master head attachments may be applied for holding various types of tools for operation on work supported on tables T adjustable on the bed 93 of the base 92. My improved boring head is shown applied to the middle column B, and, referring to Figure 6, the construction and operation of the master head M thereon is substantially the same as that disclosed in my pending application referred to. The master head receives the screw shaft 94 which has the gear 95 thereon driven by a pinion 96 on a shaft 97 connected with a transmission train 98 extending from reversible driving means (not shown) in the base 92. Bolts 99 serve to hold the master head rigidly to the column after the vertical adjustment thereof.

Journaled in the master head is a driving shaft 100 reversibly driven by gearing 101 connected by the shaft 102 with the belt pulley 103 connected by a belt 104 with the electric motor E mounted on the master head, this motor being of the reversible type.

The drive shaft end 105 has the frusto-conical socket 106 therein and is journaled in bushings 107 and 108 in the front wall of the master head. Referring to Figures 2 and 6, the front wall of the master head has the annular recess 109 therein in which is the ring 110, the peripheral part of this ring and the opposed peripheral wall of the master head being shaped to provide an annular key slot 111 for receiving the heads of bolts 112.

Extending from the master head is the centering boss 113, concentric with the drive shaft 100, the boss receiving the recess 114 in the base wall 11 of the boring head housing to center the housing accurately relative to the drive shaft 100 in the master head. The bolts 112 extend through the housing 10 of the boring head and upon tightening of the nuts 115 the boring head housing is rigidly secured to the master head. By loosening the nuts, the boring head may be rotated into any position on the master head for horizontal, vertical or angular disposition of the boring head spindle 19. When the boring head is applied to the master head, the frusto-conical driving plug 13 enters the socket 106 in the end of the master head drive shaft 100, and suitable coupling means are provided for coupling the plug 13 to the shaft 100. As shown on Figure 2, a key 116 extends through the plug 13 for engagement in the slots 117 in the outer edge of the socketed end 105 of the master head shaft 100. When the boring head is mounted on the master head, it can be adjusted vertically with the head to any position above the machine bed, and the motor E can be controlled for rotation of the boring spindle 19 in either direction and at any desired speed.

In the left end of the housing 10 a stop ring 118 receives the spindle 19 and has a key tongue 119 engaging in the spindle keyway 22. The ring thus rotates with the spindle but is held against axial movement by the housing wall 120 and the bearing 20. The axial movement of the spindle to the right is limited by the engagement of the spindle at the left end of the keyway 22 with the stop ring. A similar stop ring 121 is provided at the right end of the housing for engagement by the right end of the keyway when the spindle shifts to the left. Upon such stoppage of the spindle, rotation of the spindle by the gear 26 will stop and the gear will be rotated idly on the collar 23 due to the friction connection thereof with the collar.

Referring to Figure 1, the important advantage in having the boring head spindle adapted at each end for the reception of tools is that the spindle can operate at either end with work supported on the tables T. The advantage of having a number of columns is that work on one of the tables may be successively operated on by tools in the attachments applied to the master heads on the respective columns. One of these columns, as for example the column A, may be in the form of a reciprocating ram, as disclosed in my pending application hereinbefore referred to, and the other columns may be stationary.

I have shown a practical and efficient embodiment of the various features of my invention, but I do not desire to be limited to the exact construction, arrangement or operation shown and described, as changes and modifications are possible without departing from the scope of the invention.

I claim as follows:

1. A boring head for machines of the type referred to, comprising a housing, a spindle journaled in said housing for rotary and axial movement, threading on said spindle, a bushing receiving said spindle and having threading meshing the threading on the spindle, said bushing being rotatable on the spindle but held against axial movement, driving means for rotating said spindle, driving means for said bushing including speed change gears, said driving means for the spindle and the bushing being arranged to rotate the bushing and spindle in opposite directions and with the speed of rotation of the bushing greater than that of the spindle whereby the spindle will be axially shifted during rotation thereof, selection means for selecting speed change gears for operation, manually operable means for effecting rotation of said bushing, and means automatically setting said selecting means for disconnection of said speed change gears from said bushing when said manual means is set for service and for automatically disconnecting said manual means from the bushing when said selecting means is set for operation of said speed change gears.

2. A boring head for machines of the type referred to, comprising a housing, a spindle journaled in said housing for rotary and axial movement, threading on said spindle, a bushing receiving said spindle and having threading meshing the threading on the spindle, said bushing bing rotatable on the spindle but held against axial movement, driving means for rotating said spindle, driving means for said bushing including speed change gears, said driving means for the spindle and bushing being arranged to effect differential rotation of the spindle and bushing for axial feed of the spindle, selection means for selecting speed change gears for operation, manually operable means for effecting rotation of said bushing, and means automatically setting said selecting means for disconnection of said speed change gears from said bushing when said manual means is set for service and for automatically disconnecting said manual means from the bushing when said selecting means is set for operation of said speed change gears.

FRANK W. HACK.